Figures 1, 2:
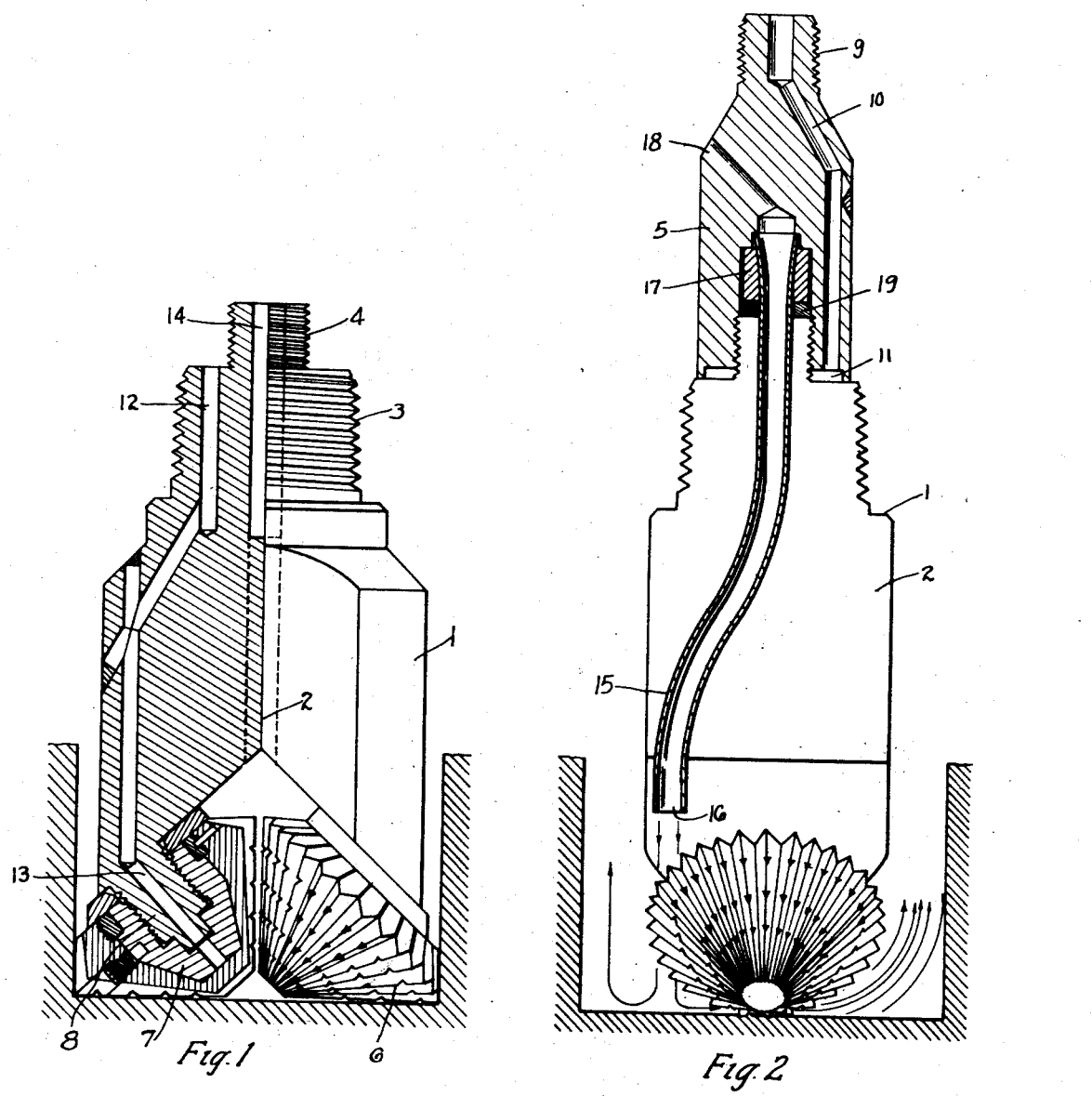

Aug. 15, 1933. J. A. HERRINGTON 1,922,436
FLUSHING DEVICE FOR WELL DRILLS
Filed May 4, 1931

J. A. HERRINGTON INVENTOR

BY Jesse R. Stone

ATTORNEY

Patented Aug. 15, 1933

1,922,436

UNITED STATES PATENT OFFICE 1,922,436

FLUSHING DEVICE FOR WELL DRILLS

John A. Herrington, Houston, Tex., assignor to Hughes Tool Company, Houston, Tex., a Corporation of Texas Application May 4, 1931. Serial No. 534,717

6 Claims. (Cl. 255—71)

My invention relates to well drills employed in drilling deep wells, and has to do particularly with means to direct the flushing fluid upon the well bottom in a more effective manner. I find that with bits having rolling cutters, it is difficult to keep the cutters clean of the material disintegrated by the drill at the bottom of the well bore, and my invention has for an object, the directing of the flushing fluid from the drill in a manner to best clear the cutters and carry away the detritus from the well bottom.

I also desire to provide a detachable and replaceable tube for conducting the fluid through the drill which will be held in position without the necessity of a threaded connection.

I desire to clamp the removable tube in position by means of the lubricator cage so as to form a seal at the upper end of the drill head.

In the drawing herewith, Fig. 1 is a side view, partly in central vertical section, of a drill constructed to use my invention.

Fig. 2 is a central vertical section, taken in a plane at right angles to the Fig. 1 position, showing the drill with my invention thereon.

The drill shown with my invention is a rock drill of common construction having a head 1 divided longitudinally into two sections, the division being along a plane 2. The upper end of the head has a threaded shank 3 for connection with a drill collar and a centrally extending threaded nipple 4 to engage with the lubricator cage 5.

At the lower end of the head are two opposite conical shaped cutters 6 which are rotatable on bearings 7 mounted upon shafts 8 integral with the head. The lubricant is conducted to the cutter bearings from a lubricator barrel, not shown, adapted to be screwed upon the upper shank 9 of the lubricator cage 5. A passage for lubricant is provided at 10 through the cage to a chamber 11 between the cage and the drill head. From this chamber the lubricant passes through the duct 12 to the passage 13 in the cutter shaft 8.

My improvement lies in the construction of the water passage. The two sections of the head, having mating grooves 14 which are axial of the head at the upper end, but curve laterally to discharge at one side of the head above the cutters.

A removable tube 15 is fitted in the grooves to form a watercourse, said tube being curved to fit said grooves and extends slightly downwardly beyond the grooves, as shown at 16, so that the water is discharged close to the cutters. The upper end of the tube extends above the head of the drill and has a block 17 of metal thereon into which the tube is swaged. The enlarged upper end of the tube receives fluid from a passage 18 through the lubricator cage, which, when screwed in position, clamps upon said block and said tube. I provide a packing gasket 19 between the block 17 and the upper end of the nipple 4 of the head so that a seal will be provided when said cage is screwed in position.

By securing the removable water tube in position in this manner, no threaded connection of the tube with the head is necessary and economy of construction is accomplished. The curving of the tube to discharge the fluid at one side of the cutters accomplishes a fluid circulation which is most effective.

The arrows indicate the course of the fluid. The water strikes the cutters at one side and engages the well bottom so as to carry the cuttings up away from the bottom and raise them in suspension upwardly around the drill toward the surface. I obtain not only a better contact of the fluid upon the cutters but I also obtain a circulation of the liquid which more effectively carries away the cutting.

What I claim as new is:

1. A well drill including a head longitudinally divided into two sections, the meeting faces of said sections having registering grooves to form a single water passage curved to discharge fluid at one side only at the lower end of said head, cutters on said head, a replaceable tube in said passage, a block on said tube above said head, means engageable with said head to clamp said block on said head and means to seal the connection of said block with said head.

2. A well drill including a head longitudinally divided into two sections, the meeting faces of said sections having registering grooves to form a water passage curved to discharge fluid at one side only, at the lower end of said head, cutters on said head, a replaceable tube in said passage, the upper end of said tube projecting above said head, a block fixed to said upper end packing means beneath said head, and means to clamp said block to said upper end to seal said block and tube with said head.

3. A well drill including a head longitudinally divided into two sections, the meeting faces of said sections having registering grooves to form a water passage curved to discharge fluid at one side only, at the lower end of said head, cutters on said head, a replaceable tube in said passage, the upper end of said tube projecting above said head, a block fixed to said upper end, and means to seal said block and tube with said head comprising a packing ring below said block and a member screwed upon said head and bearing upon said block to clamp it tightly upon said packing ring.

4. A well drill including a head longitudinally divided into two sections, the meeting faces of said sections being formed with mating grooves to provide a fluid passage axially of said head at the upper end but curved to discharge the fluid at one side of the head, and a replaceable tube curved to fit said passage, said tube projecting above said head, a block on said tube, and a lubricator cage adapted to be screwed upon said head and slidably engage and clamp said tube head in position.

5. A well drill including a head longitudinally divided into two parts, a frusto-conical shaped cutter on each part adapted when said head is assembled to set opposite each other, mating grooves in said head to provide a fluid passage axially of said head at its upper end, but curved to discharge all of the flushing fluid at one side of said cutters, a curved tube in said groove, and means to seal around said tube at its upper end.

6. A well drill including a head longitudinally divided into two parts, a frusto-conical shaped cutter on each part adapted when said head is assembled to set opposite each other, mating grooves in said head to provide a fluid passage axially of said head at its upper end, but curved to discharge all of the flushing fluid at one side of said cutters, a curved tube in said groove projecting above said head, a block fixed rigidly upon the projecting upper end of said tube, and means below said block to seal said tube in said passage.

JOHN A. HERRINGTON.